This invention relates to a curing form for elastomeric articles of manufacture and particularly externally-ribbed elastomeric members.

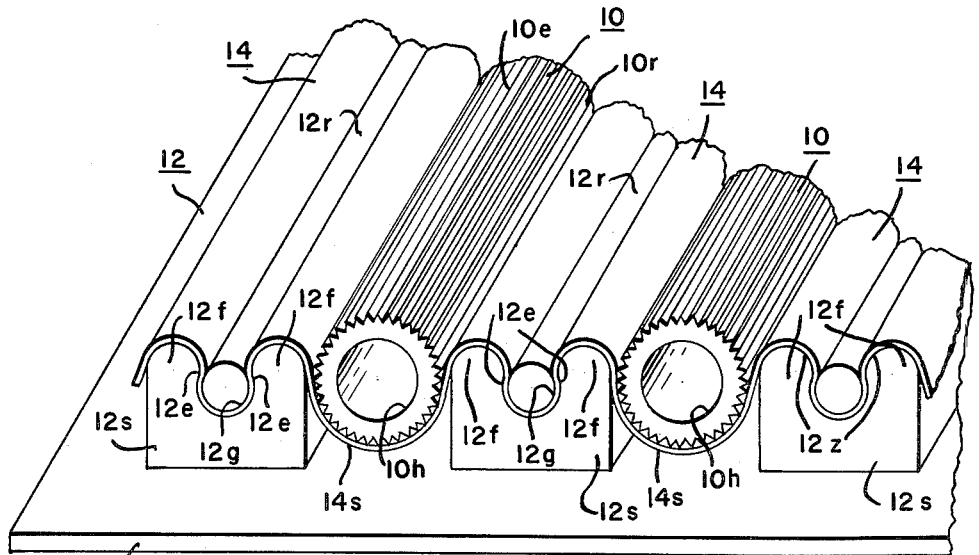
Fig. 1
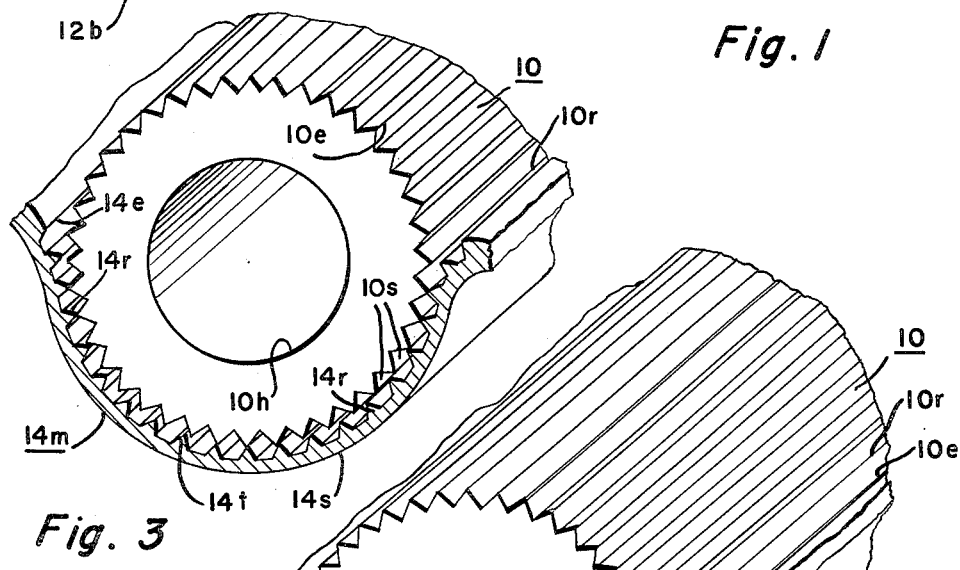
Fig. 3
Fig. 2
INVENTORS
Paul E. Clingman
BY Chester A. Lowe
John T. Marvin
Their Attorney 3,016,567
CURING FORM
Paul E. Clingman and Chester A. Lowe, Dayton, Ohio, assignors to General Motors Corporation, Detroit, Mich., a corporation of Delaware
Filed July 24, 1958, Ser. No. 750,606
6 Claims. (Cl. 18—6)

An object of this invention is to provide a new and improved curing form for supporting an externally-ribbed elastomeric member in such a manner that it may be uniformly and efficiently cured.

Another object of this invention is to provide a curing tray including a form adapted to be conformable to an elastomeric member supported therein and embraced along external ribbing whereby heated gases such as steam can pass efficiently and uniformly about the elastomeric member to provide a finished member with a substantially uniform surface texture and appearance.

Another object of this invention is to provide an elastomeric hose curing tray including a plurality of spaced elongated supports, each having longitudinally-extending, partially-cylindrical grooves or channels into which loops of a mat of material are inserted to be retained by rod-like means in the grooves while the mat sags intermediate the supports and provides roughly semi-cylindrical surface area conformable and partially embracing and externally-ribbed elastomeric curable part therein, the mat being flexible and permitting passage of heated gas and/or steam to pass uniformly and efficiently relative to the externally-ribbed elastomeric part for curing thereof.

A further object of this invention is to provide a curing form including a flexible longitudinally-ribbed portion in a trough relative to which an extruded externally-ribbed uncured elastomeric member is placed so that ribs are out of mesh and tips of trough ribs support the elastomeric member along tips of ribs thereof leaving space therebetween through which a heated fluid medium can pass for uniformly and efficiently curing the elastomeric member.

Further objects and advantages of the present invention will be apparent from the following description, reference being had to the accompanying drawings wherein a preferred embodiment of the present invention is clearly shown.

In the drawings:

FIGURE 1 is a fragmentary perspective view of a curing form of the present invention.

FIGURE 2 is an enlarged fragmentary view of a portion of FIGURE 1 showing a curing form for use in the process of the present invention.

FIGURE 3 is an enlarged fragmentary view of a modification in a curing form and process in accordance with the present invention.

During the manufacture of elastomeric material parts, there are sometimes blemishes, blister areas, and other defects along an external surface. Such blemishes or defects occur partly due to presence of pockets of air relative to uncured elastomeric material and sometimes due to the process of curing such elastomeric material parts. It has been found that extruded elastomeric material, hoses, or tubular members made by previous processes of curing have obvious blemishes, blisters, and similar imperfections on external surfaces thereof appearing to reflect on the quality of the hose and making it difficult to sell or even unsalable regardless of its functional qualities. This is partly true in the manufacture of tubular members for automotive vehicle use in hydraulic brake systems or even in automotive vehicle clearance height control systems wherein air springs are provided for maintaining a predetermined clearance height between a sprung mass or chassis and an unsprung mass or undercarriage and suspension linkage arrangement of a vehicle.

It has been the practice to manufacture hose or tubular members with a smooth, fine-mesh, fabric-like external surface. This effect is achieved by tightly wrapping an extruded unvulcanized hose in lengths of about 25 feet in some 12 layers of a cloth and curing the wrapped hose in a steam chamber. The relatively short life of such cloth and the wrapping operation adds a considerable amount of cost to the hose.

Referring to FIGURE 1, in accordance with the present invention, the elastomeric members or hoses, generally indicated by numeral 10, can be extruded to have a longitudinally-ribbed external surface on which any blisters, blemishes, and other imperfections will not appear or are relatively unnoticeable. By curing the tubular members or elastomeric hoses in accordance with the present invention, the hose is attractive and salable as well as acceptable for automotive vehicle use as brake lines or as air suspension system lines. The elastomeric members 10 are extruded to have a hollow interior or longitudinal passage 10h therethrough, and a plurality of ribs 10r are formed extending radially outwardly and longitudinally of the external suface of the hose as the latter is extruded in a suitable manner. The curing form or tray 12 in accordance with the present invention includes a base 12b on which there is provided a plurality of laterally spaced elongated supports 12s. Each of these longitudinally extending supports can be bonded or otherwise secured into parallel relation with each other on one side of the base 12b. The supports 12s have a substantially U-shaped configuration and include longitudinally-extending partially-cylindrical grooves 12g. A pair of upwardly extending flanges 12f preferably form each longitudinally-extending partially-cylindrical groove 12g of each support 12s.

Each of the flanges 12f is provided with an arcuate or semi-cylindrical curved upper surface 12z over which a curing form material generally indicated by numeral 14 is placed. This curing form material is flexible and conformable to the arcuate upper surface 12z of the flanges 12f. The material 14 can be a closely woven cloth or a sheet of elastomeric material as explained in further detail below. In either event, the material such as cloth is adjustably secured to the elongated supports or blocks 12s by depressing the material 14 within the grooves 12g and inserting rod-like means or bars 12r in each of the grooves. These rods or bars 12r are retained in each groove 12g due to a lateral extension 12e provided on one side of each flange 12f and serving to lock the bar or rod 12r together with the material 14 relative to elongated supports or blocks 12s. The material 14 is adapted to provide a sagging portion 14s between the blocks or elongated supports 12s in predetermined parallel and spaced relationship to the grooves 12g of each elongated support 12s. The sagging portion 14s of the material 14 forms a flexible supporting means substantially semi-cylindical and conformable relative to a complementary area of an extruded elastomeric tubular member 10.

As illustrated in FIGURE 2, which is an enlarged representation of a portion of the curing form shown in FIGURE 1, the extruded elastomeric tubular member 10 is supported by longitudinal ribs 10r relative to an upper surface of the atmosphere-permeable support that can be provided with the curing form in accordance with the present invention. In the embodiment of FIGURE 2, the atmosphere-permeable support comprises canvas or any closely woven material sufficiently strong to support the extruded tubular member 10. Each of the ribs 10r has a longitudinal edge 10e relative to which contact is made with the atmosphere-permeable support. A curing or vulcanization of the elastomeric member 10 occurs as the curing form, in accordance with the present invention, is placed in an autoclave or subjected to a heated gas and/or steam from a suitable source and/or oven. In the embodiment illustrated by FIGURE 2, such heated gas or steam can flow in a direction indicated by arrows 16 representing flow and passage of such heated gas and/or steam longitudinally intermediate the ribs 10r. This flow provides passage of the heated gas and/or steam through space 10s intermediate external longitudinally extending ribs 10r. Since the embodiment of FIGURE 2 represents use of canvas or any closely woven material, there is an additional flow of heated gas and/or steam transversely relative to the extruded elastomeric member 10 due to passage of the heated gas transversely through the canvas or closely woven material as represented by arrows 18.

In the embodiment represented in FIGURE 3, the mat 14 is replaced with a sheet of rubber-like material generally indicated by numeral 14m having a plurality of longitudinally-extending ribs 14r on at least one surface thereof. Each of these ribs is integral with the rubber-like mat 14m and provides a longitudinally-extending edge 14e. In accordance with the present invention, the ribs or teeth 14r of the mat 14m are adapted to be non-meshing relative to the ribs 10r on the extruded elastomeric member 10. Thus the extruded elastomeric member and curing form or tray are each provided with ribbed surfaces which do not mesh. It is to be noted that the tips of the ribs or teeth 14t formed in a trough 14t by the mat 14m support the hose along the longitudinal edges 10e or tips thereof. The extruded tubular member or hose 10 can be readily placed on the ribbed portions forming a trough for supporting the hose on a substantially semi-cylindrically-shaped curing form. It should be noted that supporting the hose within a trough on a substantially semi-cylindrical curing form is essential since uncured or unvulcanized rubber or rubber-like material is relatively soft and pliable when heated and would flatten to a considerable degree before curing is complete if the hose or tubular means 10 were cured on a flat pan.

Elastomeric members such as garden hose and the like have been manufactured for years with ribbed external surfaces. However, a process for curing such externally-ribbed hose has previously involved ribbing of the hose in a lead sheath prior to curing thereof. In accordance with the process of the present invention, an externally-ribbed extruded elastomeric article of manufacture is produced in steps including providing a curing form conformable to an elastomeric article and supporting the elastomeric article along edges of external ribs thereof. There is an additional step of passing heated gas and/or steam through spacing intermediate the external ribs for effecting curing and/or vulcanization of the elastomeric article with an externally-ribbed outer surface. It is to be understood that the semi-cylindrically-shaped support provided by the curing form in accordance with the present invention is achieved in part by the use of elongated blocks or supports 12s relative to which the material 14 is suspended and in part by the weight of the extruded elastomeric member 10 which is placed into the semi-cylindrical support portions 14s. The weight of the extruded elastomeric member enhances formation of the semi-cylindrical support portions 14s and embracing of the mat relative to the extruded elastomeric members in complementary relationship to each other is a desirable object in accordance with the present invention. Embracing action assures formation of an arcuately-shaped elastomeric member and avoids flattening of relatively soft and pliable uncured elastomeric material before curing is completed.

The flexible curing form, in accordance with the present invention, is adapted to maintain the shape of extruded elastomeric products during curing and/or vulcanization operations. The flexibility of the curing form illustrated in FIGURES 2 and 3 assures support of an extruded elastomeric member over as great a surface area as possible relative to longitudinal edges of external ribs and avoids local deformation of the surface of the elastomeric member or product. The curing form is easily spread in a free position and can be easily loaded. The weight of the extruded part serves as a load between a pair of fulcrums whereby a sagging portion is deflected so that arcuate sides of an elongated extruded tubular member are embraced and supported with a minimum of surface deformation. A step of cradling the elastomeric member to be cured is facilitated by provision of the external longitudinally extending ribs forming longitudinal edges engageable with the curing form and separating spaces such as 10s intermediate the ribs 10r. The space 10s permits heated gas and/or steam to pass longtudinally along the ribs for curing elastomeric material of the extruded members.

It is to be understood that the curing form including the base 12b, in accordance with the present invention, can be placed on racks which are movable into a relatively large autoclave or oven in which heated gas and/or steam is supplied for curing the elastomeric members. Due to engagement of the elastomeric members only along edges of ribs, a minimum surface area of the elastomeric members is used for support relative to a substantially semi-cylindrical or arcuate outer periphery of the elastomeric extruded member.

In the embodiment of FIGURE 3, the hose or elastomeric tubular member is supported mainly between top portions of ribs or non-meshing longitudinal corrugations corresponding generally to ribs or corrugations of a complementary curing form support. Space between these ribs or corrugations is adapted to provide a path for passage of heated gas or live steam between the hose and mat or channel member. With minimum contact between the mat and extruded member, there is a minimum degree to which a surface of the extruded tubular member is distorted and the external ribbing tends to conceal blemishes, blisters, or surface defects. The uncured or unvulcanized externally-ribbed extruded elastomeric member is cradled by the material or mat of the curing form and once the weight of the member is removed after curing is completed the material or mat can return to a free and unflexed position. The supports 12s serve as fulcrums in pairs for supporting an elastomeric member in accordance with the present invention.

It is to be understood that the curing form of FIGURE 3 can have the mat 14m made of extruded metallic material such as aluminum and having troughs or sagging portions formed integral with longitudinal support portions to replace separate longitudinal support portions and retaining means such as illustrated in FIGURE 1. An extruded aluminum pan or mat 14m is necessarily also provided with longitudinal ribs 14r which are out of mesh relative to ribs on the elastomeric article of manufacture to be cured. Approximately 10 ribs per quarter inch are suitable in the trough or sagging portion. Aluminum is particularly useful for making a curing form in accordance with the present invention because it can be easily extruded with the ribs thereon, because it is light in weight for convenient handling, and because it readily conducts heat. However it is to be understood that material other than aluminum can be used to make a curing form in accordance with the present invention, and metal such as aluminum is used only where curing form resilience is not absolutely necessary. It should also be noted that in place of canvas-type cloth, a metallic gauze can be used in the embodiment of FIGURE 2. The metallic gauze is preferably light in weight and flexible and a suitable gauze could be provided with aluminum strands interwoven to form a material adapted to be draped into forming troughs in accordance with the present invention.

While the embodiment of the present invention as herein disclosed constitutes a preferred form, it is to be understood that other forms might be adopted.

What is claimed is as follows:

1. A curing tray for use in curing externally ribbed elastomeric articles of manufacture, comprising, at least a pair of longitudinal support members located in substantially parallel relation to each other, said support members each providing a longitudinal groove, a flexible mat-like form adapted to be suspended between said support members and having a loosely sagging portion laterally intermediate said support members, and retaining means provided for positioning said flexible mat-like form in predetermined adjustable locations in locked relation positively within the longitudinal groove of each of said support members, said form being resiliently laterally and longitudinally conformable and engageable relative to the external ribbed elastomeric articles of manufacture while space intermediate the externally ribbed elastomeric articles of manufacture and said mat-like form is supplied with heated gas and/or steam for effecting uniform and efficient curing of the externally ribbed elastomeric articles of manufacture.

2. A curing form, comprising, a base portion, at least a pair of longitudinal support members provided on said base portion and each having an upper arcuate surface, a sheet of flexible material providing a loosely sagging portion for support of a longitudinal elastomeric member having an external ribs forming longitudinal edges therewith, and means for securing said flexible material relative to said upper arcuate surface of said longitudinal support members on opposite sides of said sagging portion that supports the elastomeric member along longitudinal edges of external ribs thereof and that conforms to a semi-cylindrical cross-sectional shape relative to the radially outer edges of the elastomeric member.

3. The curing form of claim 2 wherein said flexible material sheet is made of rubber-like material having longitudinal ribs adapted purposely to be out of mesh relative to the external ribs of the elastomeric member, said out of mesh ribs permitting support of the elastomeric member in edge-like contact relative to external ribs thereof between which space is provided to let heated gas and/or steam for curing pass longitudinally between both elastomeric member and said flexible material sheet ribs.

4. The curing tray of claim 1, wherein said retaining means are rod-like elements longitudinally insertable relative to the grooves between flanges provided by each of said support members on opposite sides of the groove and having inwardly protruding edges for locking the rod-like elements against removal laterally of the groove, said rod-like elements serving to hold said mat-like form relative to said support member grooves on opposite sides of said loosely sagging portion that forms a trough in a semi-cylindrical peripheral shape relative to the externally-ribbed articles the weight of which effects enhancement of lateral embracing of said form relative to the externally-ribbed elastomeric articles of manufacture.

5. The curing tray of claim 2 wherein said form is made of a closely-woven and in-part-semi-cylindrical curved metallic gauze.

6. In apparatus for use in curing an elastomeric article of manufacture having ribs that extend laterally outwardly and substantially longitudinally thereof completely and generally uniformly about an annular periphery, the improvement which comprises a longitudinally extending form of material such as light-weight metal, flexible rubber-like sheet, mat and the like consisting of at least one longitudinal trough substantially semi-cylindrical as collectively formed by ribs that are integral with said form, said ribs of the form having definite out-of-mesh relation to the external ribs of the elastomeric article of manufacture to be subjected to curing, said curing-form ribs having space laterally therebetween purposely to remain open and free for passage of heated curing gas substantially evenly and uniformly longitudinally therethrough due to definite out-of-mesh contact limited between the external ribs of the article and curing-form ribs during curing.

References Cited in the file of this patent

UNITED STATES PATENTS

| | | |
|---|---|---|
| 974,380 | Hoagland | Nov. 1, 1910 |
| 1,501,833 | Amsel | July 15, 1924 |
| 1,543,890 | Williams | June 30, 1925 |
| 1,931,649 | Eger | Oct. 24, 1933 |
| 2,156,909 | Boyer | May 2, 1939 |
| 2,226,768 | Harrison | Dec. 31, 1940 |
| 2,246,448 | Maham | June 17, 1941 |
| 2,371,747 | Faris et al. | Mar. 20, 1945 |

OTHER REFERENCES

McPherson, A.: Engineering Uses of Rubber, Reinhold Publishing Corps., 1956, pp. 448–9.